Feb. 27, 1934.   D. W. BOYLAN ET AL   1,948,956
COUPLING FOR PIPE WRAPPING MACHINES
Filed Sept. 11, 1929
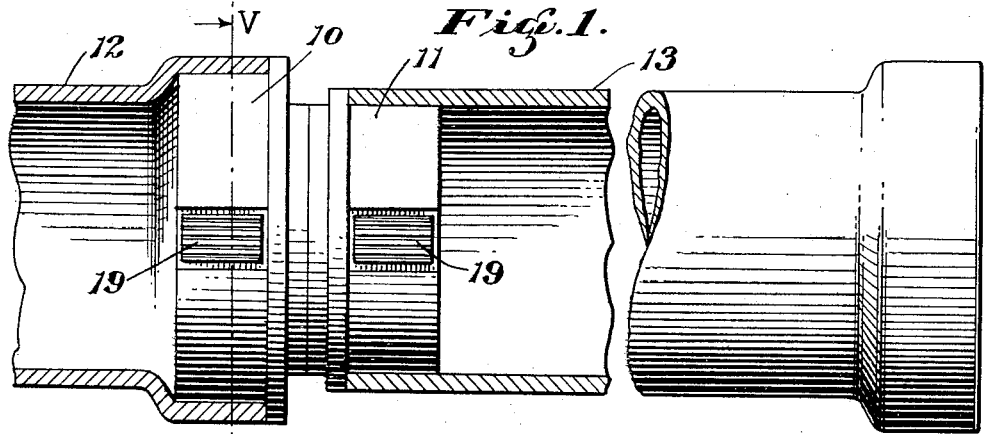
*Fig. 1.*
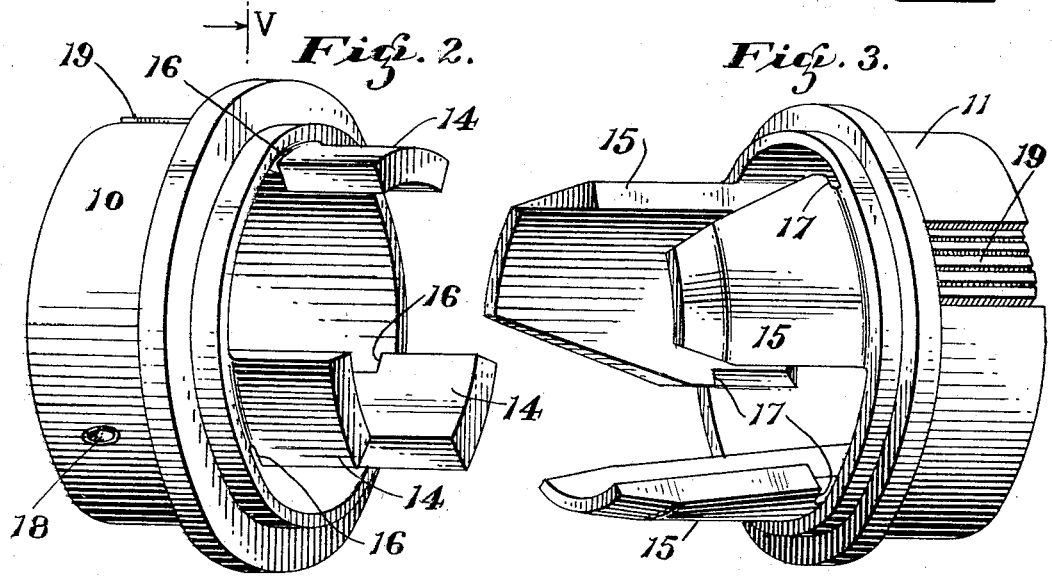
*Fig. 2.*   *Fig. 3.*
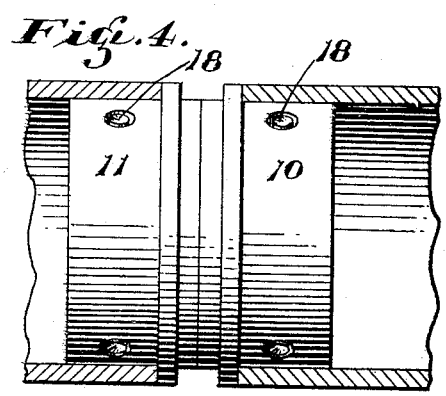
*Fig. 4.*
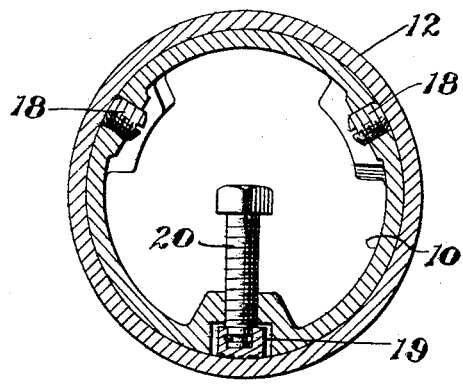
*Fig. 5.*
INVENTORS
DAVID W. BOYLAN
HERMAN KRAMER
EMILE JANSEN
BY Townsend, Loftus & Abbett
ATTORNEYS.

Patented Feb. 27, 1934

1,948,956

UNITED STATES PATENT OFFICE 1,948,956

COUPLING FOR PIPE WRAPPING MACHINES

David W. Boylan, San Francisco, Calif., and Herman Kramer, Tulsa, Okla., and Emile Jansen, San Francisco, Calif., assignors to General Paint Corporation, San Francisco, Calif., a corporation of Nevada Application September 11, 1929
Serial No. 391,758

6 Claims. (Cl. 285—1)

Our present invention relates to a new and useful improvement in connection with pipe wrapping and coating machines and more particularly to a temporary coupling member for connecting the successive lengths of pipe together in order to properly feed them into the wrapping machine in a continuous manner.

The object of our invention is to provide a new, novel and simple coupling or connection device for the adjacent ends of pipe in order to facilitate their feed into a pipe wrapping or coating machine.

In a prior patent to Wieland et al, No. 1,572,258, dated February 9, 1926, there is disclosed a pipe wrapping machine of the type with which it is contemplated our invention will find application. In this patent the various lengths of pipe are projected therethrough in a continuous manner while paper and/or other material is applied to the pipe.

In order to facilitate a feeding of the successive lengths of pipe to a machine of this character, we propose to provide a novel form of coupling means at the adjacent ends of the lengths of pipe. In this coupling means there is provided a novel arrangement of interlocking jaws which operate so as to hold the pipes together in a firm manner until the coupling has passed through the machine, and to then operate in such a manner as to render the pipes easily separable at the coupling.

For a better understanding of our invention, reference should be made to the accompanying drawing wherein—

Figure 1 is a fragmentary and partially sectionalized view in elevation showing our improved coupling device connecting two lengths of pipe of the overlapping type, Figures 2 and 3 are perspective views showing the two cooperating parts of our improved coupling device.

Figure 4 shows a coupling device similar to that shown in Figure 1, except that the two parts thereof are of similar dimensions, in order to adapt it to pipes of the same internal diameter at the connecting ends, and Figure 5 is a sectional view taken along line V—V of Figure 1.

In Figure 1 of the drawing, 10 designates what I shall term the leading end of our coupling member and 11 designates what we shall term the trailing member of our coupling device. The coupling member 10, it will be understood, is expanded, as will be hereinafter explained, into a length of pipe 12, and the coupling member 11 is similarly expanded into a length of pipe 13.

In connection with this view of the drawing, it will be assumed that the two lengths of pipe 12 and 13 are rigidly held together by means of the clamping members 10 and 11 and that they are being rotated toward and to the left of the observer so that any wrapping applied thereupon will be spirally applied about the pipe as it progresses through the machine.

By referring now to Figures 2 and 3 of the drawing, it will be seen that the members 10 and 11 are provided with interlocking projections or jaws 14 and 15 respectively. The jaws 14 upon the member 10 are provided with an undercut notch 16 and jaws 15 upon the member 11 are provided with overhanging tongues, or bosses, 17. When the parts are assembled, as illustrated in Figure 1, it will be understood that the bosses 17 extend into the notches 16 upon the member 10 so as to securely hold the coupling members 10 and 11 against axial displacement, and, at the same time, permit a ready separation of the parts after the coupling has passed through the machine, as will be explained more fully hereinafter in connection with a description of the operation of our improved coupling.

In connection with the showing of Figure 4, it will be understood that the members 10 and 11, except for their difference in diameters, are constructed identically with the corresponding members illustrated in Figures 2 and 3.

The manner of expanding the coupling members into the pipes 12 and 13 is illustrated in Figure 5 wherein the body of the coupling members 10 and 11 are illustrated as having a pair of set screws 18 which are adjustable to any desired point, and also an outwardly movable jaw 19 which may be displaced by means of a screw threaded bolt 20. From this illustration it will be seen that the jaw 19 cooperates with the set screws 18 to provide a three-point support for the pipe upon the coupling members.

The operation of our improved device is as follows:

It will be assumed that the parts 10 and 11 have been properly secured within the adjacent ends of two lengths of pipe and that the left end length of pipe is progressing through the machine in a spiral manner. Under these conditions the pipe within the machine will exert a traction effort upon the trailing length of pipe when its coupling member engages the coupling upon the pipe being turned. Before the pipe 12 within the machine has been completely wrapped the operator will project a second length of pipe 13, upon which there has been mounted the portion 11 of my improved coupling device, into engagement with coupling member 10 provided upon the leading length of pipe. When this is done the overhanging tongues or bosses 17 of member 11 will engage in the notches 16 of member 10 and thus cause the latter, together with the pipe 13 carried thereby, to rotate in unison with the leading length of pipe 12 and as the lengths of pipe, together with their coupling members, progress through the machine the wrapping will be continued. During this portion of travel of the pipes it will be seen that the engagement of the overhanging tongues 17 and the undercut notches 16 will tend to hold the coupling members 10 and 11 firmly together.

As soon as the coupling members 10 and 11 have passed through the wrapping machine to a point beyond where the wrapping is applied, and motion is imparted thereto, it will be seen that the driving forces will then be applied to the length of pipe 13 which carries the coupling member 11. This will mean that the driving forces between the two lengths of pipe may be considered as having been reversed insofar as the cooperating faces of the two coupling members 10 and 11 are concerned, and, as a result, the member 11 will tend to carry the overhanging tongues 17 upon the member 11 out of engagement with the notches 16. As soon as the parts 10 and 11 have rotated with respect to each other a distance sufficient to bring the overhanging tongues 17 and notches 16 out of their overlapping engagement the pipes may be readily separated and the wrapped length of pipe removed from the pipe still being operated upon by the machine.

It will be understood that if the wrapping of the lengths of pipe is carried out in a continuous manner over the coupling members, as is sometimes done, there will be provided a means for cutting the wrapping material to thus permit a separation of the lengths of pipe.

From the above it will be seen that we have provided a new, novel and effective coupling device, by means of which a continuous feeding of separate lengths of pipe into a wrapping machine may be efficiently carried out, and while we have illustrated and described our invention in connection with a preferred embodiment thereof, we desire to have it understood that various changes may be made therein without departing from the spirit and scope of our invention as defined in the appended claims.

Having thus described our invention, what we claim and desire to secure by Letters Patent is—

1. Means for detachably connecting pipes which are being fed through a wrapping machine, said means comprising a pair of complementary members, each of said members comprising a part dimensioned to fit easily within the ends of said lengths of pipes without distortion of said ends, means on said members for quickly attaching them to and detaching them from said pipe lengths, and means on said members for temporarily attaching said members together, whereby said pipe lengths may be attached one to another without distortion thereof and leaving the complete outer surfaces thereof exposed for treatment.

2. Means for detachably connecting pipes which are being fed through a wrapping machine, which means comprises a pair of complementary members each of said members comprising a part dimensioned to slide easily into and out of the ends of said lengths of pipes without distortion of said ends, each of said members having thereon a jaw movable substantially radially thereof, a bolt rotatively attached to said jaw and threaded through said member, each of said members also having thereon two screws threaded therethrough and adapted to project slightly beyond the outer surfaces thereof, and means on said members for quickly attaching them together by relative rotation thereof in one direction and for detaching them from each other by relative rotation in the other direction, whereby said pipe lengths may be attached one to another without distortion thereof and leaving the complete outer surfaces thereof exposed for treatment.

3. Means for detachably connecting pipes which are being fed through a wrapping machine, which means comprises a pair of complementary members each of said members comprising a part dimensioned to slide easily into and out of the ends of said lengths of pipes without distortion of said ends, each of said members having thereon a jaw movable substantially radially thereof, a bolt rotatively attached to said jaw and threaded through said member, each of said members also having thereon two screws threaded therethrough and adapted to project slightly beyond the outer surfaces thereof, tongues upon each of said members adapted to interlock with each other to prevent radial displacement of attached lengths of pipes with respect to each other, and overhanging projections upon said interlocking tongues adapted to co-operate and prevent axial displacement of said lengths of pipes, whereby said pipe lengths may be temporarily attached one to another without distortion thereof and leaving the complete outer surfaces thereof exposed for treatment.

4. Means for detachably connecting pipes which are being fed through a wrapping machine, which means comprises a pair of complementary members, each of said members comprising a part dimensioned to slide easily into and out of the ends of said lengths of pipes without distortion of said ends, each of said members having thereon a jaw movable substantially radially thereof, a bolt rotatively attached to said jaw and threaded through said member, each of said members also having thereon two screws threaded therethrough and adapted to project slightly beyond the outer surfaces thereof, tongues upon each of said members adapted to interlock with each other to prevent radial displacement of attached lengths of pipes with respect to each other, overhanging projections upon said interlocking tongues adapted to co-operate and prevent axial displacement of said lengths of pipes, and an annular flange upon each of said complementary members adapted to provide a means for separating said lengths of pipes, whereby said pipe lengths may be temporarily attached one to another without distortion thereof and leaving the complete outer surfaces thereof exposed for treatment.

5. In a coupling for temporarily securing together pipe sections, a pair of plugs adapted to loosely engage the pipes, means disposed on the plugs for engaging the inner surface of the pipes, means for actuating said engaging means, and means for coupling the plugs together.

6. A coupling for metallic pipe comprising a body portion adapted to be inserted into a metallic pipe and provided with radially extendable means to irremovably anchor the coupling within a metallic pipe, means for adjustably positioning said radially extendable anchoring means, and longitudinally extending members carried by said body portion, each of said members being provided with a transversely extending shoulder near its outer end, said shoulders extending from said members in the same circumferential direction.

DAVID W. BOYLAN.
HERMAN KRAMER.
EMILE JANSEN.